United States Patent [19]

Reinhold

[11] Patent Number: 4,793,790
[45] Date of Patent: Dec. 27, 1988

[54] APPARATUS FOR SUPPORTING TUBULAR FILMS OF THERMOPLASTIC MATERIAL

[76] Inventor: Klaus Reinhold, Krönerstrasse 3, D-4540 Lengerich i.W., Fed. Rep. of Germany

[21] Appl. No.: 100,797

[22] Filed: Sep. 24, 1987

[30] Foreign Application Priority Data

Oct. 1, 1986 [DE] Fed. Rep. of Germany ....... 8626188

[51] Int. Cl.⁴ .......................................... B29C 47/20
[52] U.S. Cl. .................. 425/325; 264/209.3; 264/565; 425/72.1; 425/387.1; 425/403.1; 425/404
[58] Field of Search ............ 425/72.1, 325, 326.1, 425/387.1, 404, 403.1; 264/209.3, 209.4, 209.5, 564, 566, 569, 565

[56] References Cited

U.S. PATENT DOCUMENTS

| | | | |
|---|---|---|---|
| 3,596,321 | 8/1971 | Upmeier | 425/326.1 X |
| 3,749,540 | 7/1973 | Upmeier | 425/72.1 X |
| 3,930,781 | 1/1976 | Upmeier | 425/72.1 X |
| 3,980,418 | 9/1976 | Schott, Jr. | 425/72.1 |
| 4,243,363 | 1/1981 | Mulcahy | 425/326.1 X |
| 4,388,061 | 6/1983 | Bebok | 264/566 X |

*Primary Examiner*—Richard L. Chiesa
*Attorney, Agent, or Firm*—Jordan & Hamburg

[57] ABSTRACT

Apparatus for the external support of tubular films of thermoplastic material consists of groups of outwardly curved supporting segments disposed successively in the direction of withdrawal of the tubular film. These supporting segments are adjustable simultaneously and in the same sense to different tubular film diameters, and for their adjusting movement they are each connected with a turning bar which is common to all supporting segment groups and journalled in a supporting frame and with a holding bar aligned parallel thereto which again is common to all supporting segment groups.

10 Claims, 2 Drawing Sheets

APPARATUS FOR SUPPORTING TUBULAR FILMS OF THERMOPLASTIC MATERIAL

BACKGROUND OF THE INVENTION

Supporting apparatus are used in the manufacture of tubular films of thermoplastic materials in tubular film blowing plants, and are connected to the extruder so as to guide and support the initially soft plastic tubular film emerging from its ring nozzle until the plastic is sufficiently solidified and cooled, so that the tubular film, which is usually withdrawn by means of a pair of rolls, can be laid flat and fed to a film winder. The external support of the tubular film by groups of supporting segments disposed successively in the direction of withdrawal, which preferably cooperate in a ring to support the tubular film with the correct diameter, enables cooling air to come externally in direct contact with the surface of the tubular film that is to be cooled, in order thus to have a favorable influence on the solidification of the plastic material and the strengthening of the plastic film.

In practice, however, this desired kind of action is made difficult to achieve by complicated adjusting mechanisms which are necessary for the purpose of adapting the supporting segments of all supporting segment groups by simultaneous adjustments of the same kind to the different tubular film diameters which are being produced in the tubular film blowing facility according to product requirements. For example, in a known supporting apparatus of the kind specified above, the bars which hold the supporting segments are disposed about halfway between the succeeding turning bars in the circumferential direction, in that each individual supporting segment is joined at its one end to the corresponding turning bar and at the other end to the corresponding holding bar. This not only results in a great mechanical complexity, but also the free access of the cooling air to the outside of the tubular film is considerably impaired under certain circumstances by the great number of the turning bars and holding bars running in the direction of withdrawal of the tubular films, whose number is determined by the number of individual supporting segments used in each group of supporting segments.

SUMMARY OF THE INVENTION

The invention is addressed to the task of creating a tubular film supporting apparatus of the kind described, whose mechanical complexity will be considerably reduced while preserving a broad range of adjustment of the supporting segments, and which at the same time will create improved conditions for the access of cooling air to the exterior of the tubular film.

This task is accomplished according to the invention, setting out from a supporting apparatus of the kind described above, primarily by combining the turning bars and the holding bars into bar units in which the holding bar is held pivotingly on the turning bar and receives one end of one supporting segment in each supporting segment group, while another end is held in a connecting piece, common also to all supporting segment groups, of an adjacent bar unit.

The combining of the turning bars and holding bars according to the invention into bar units results in a substantial improvement of design accompanied by a saving of material, which additionally gives the cooling air a better, substantially unhampered access to the outside of the tubular film due to the lack of surface covering components between the bar units. This is accomplished in connection with the fact that the connecting piece for receiving the opposite end of the supporting segment is in turn associated with the bar units.

In its simplest applications, the supporting apparatus according to the invention can have two groups of supporting segments spaced apart from one another in the direction of the withdrawal of the tubular film, but as a rule a plurality of supporting segment groups, four to six groups, for example, are used. Likewise, in simple applications, in which for example only a stabilization of the bubble of tubular film is to be achieved, only two of the outwardly curved supporting segments are provided in more or less diametrical opposition on opposite sides of the tubular film. Normally, however, more than two—for example three or four—supporting segments are provided in each group, which then cooperate ringwise in each group to adapt to the circumference of the tubular film and at the same time exercise a gauging effect thereon.

BRIEF DESCRIPTION OF THE DRAWINGS

Further details and advantages of the invention will be found in the following description and in the accompanying drawings wherein an embodiment of the subject matter of the invention is represented diagrammatically, and in which.

DETAILED DESCRIPTION OF THE PREFERRED EMBODIMENTS

Figure 1:
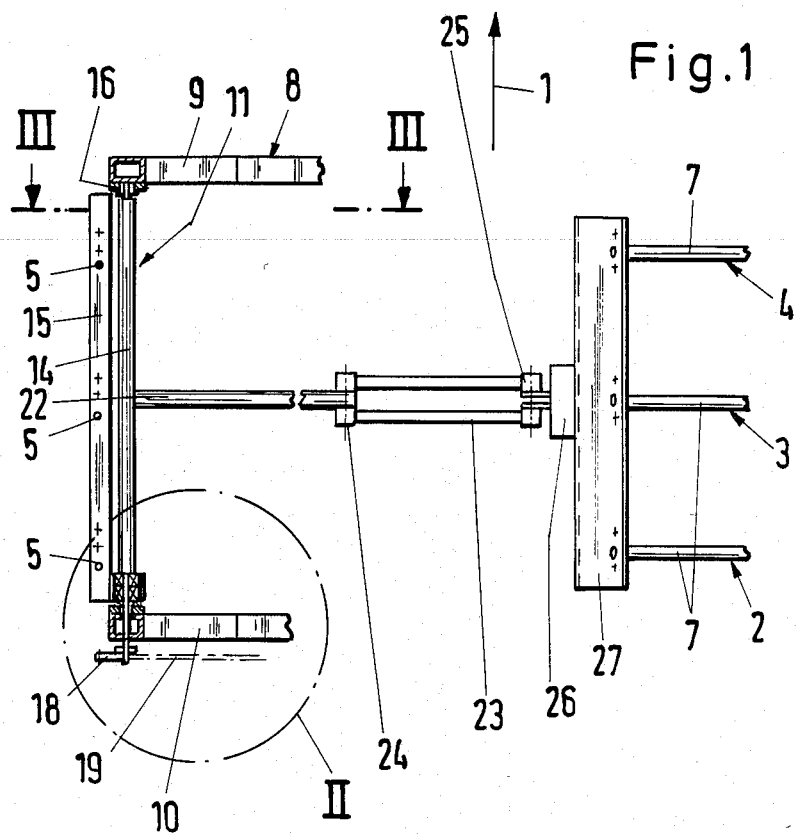
FIG. 1 is a side view, partially cut away, of a bar unit for the supporting segments of an apparatus according to the invention for the external support of tubular films of thermoplastic material, in which the boom and the link bar of this bar unit are represented in the unfolded state.

The apparatus represented in the drawing, for the external support or gauging of tubular films of thermoplastic material, is connected with the output of an extruder from whose ring nozzle the tubular film emerges in the soft plastic state. The tubular film is preferably cooled inside and out upon its emergence from the ring nozzle, with air delivered from an outer cooling ring and an inner cooling ring. The cooling ring emerging from the outer cooling ring flows over the outside of the tubular film, which is usually drawn out by a pair of rolls in the direction indicated in FIG. 1 by an arrow 1, and after it is sufficiently hardened and strengthened it is laid flat and wound up.

The external supporting and gauging apparatus consists of two or more groups of supporting segments disposed at a distance one behind the other in the direction of withdrawal 1 of the tubular film. In the example represented, three such groups of segments are provided and designated as 2, 3 and 4. Each supporting segment group 2, 3 and 4 includes two or more outwardly curved supporting segments, of which three supporting segments bearing the reference numbers 5, 6 and 7 are provided in the example represented.

The supporting segments 5, 6 and 7 are adjustable simultaneously and in the same sense in all supporting segment groups 2, 3 and 4 for adaptation to different tubular film diameters, and for this purpose they are journaled in a supporting frame identified as a whole by the number 8. The supporting frame 8 consists of an upper frame part 9 and a lower frame part 10, which are disposed transversely of the direction of withdrawal 1 and are joined together by supports (not shown) running in the direction of film withdrawal 1 into a unit forming the supporting frame 8. The two frame parts 9 and 10 each are in the form of a polygon approximating a circular shape, and are composed of individual tubular pieces of a box-like cross section.

According to the number of the supporting segments 5, 6 and 7 in each segment group 2, 3 and 4, three bar units 11, 12 and 13 are provided which are disposed in the direction of film withdrawal 1 and are common to all segment groups 2, 3 and 4. Each bar unit 11, 12 and 13 includes a turning bar 14 and a holding bar 15. The bar units 11, 12 and 13 are identical to one another, so that their construction in detail will be further explained hereinbelow in connection only with the bar unit 11.

Figure 2:
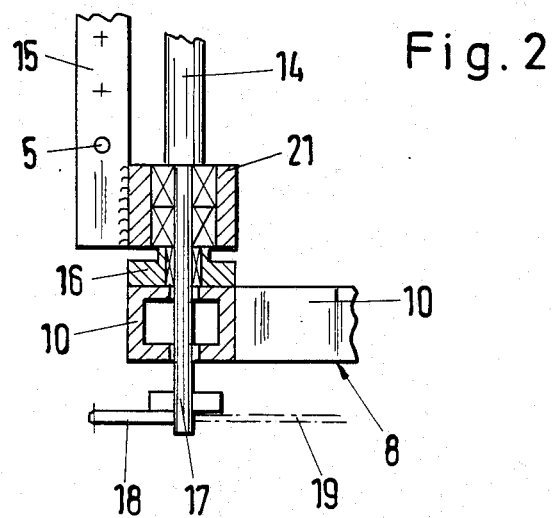
FIG. 2 is an enlarged detail II of FIG. 1.

The turning bar 14 is pivoted both in the upper and in the lower frame part 9 and 10 of the supporting frame 8 by means of a pivot 16. The pivots 16 are fastened to the underside of the upper frame part 9 and the upper side of the lower frame part 10, respectively, as can be seen especially well in FIG. 2. At the same time, the turning bar 14 is provided at both ends with a pivot pin supported in the pivot 16, of which the bottom pivot pin 17 is prolonged such that it emerges from the lower frame part 10 and here is provided with a drive gear or a drive pulley 18 as the drive member for engagement with a revolving driving means 19, such as a chain or a cable. The revolving driving means 19 is passed over pulleys 20 mounted on the bottom of frame part 10, between the drive pulley 18 of the individual bar units 11, 12 and 13, and is driven for rotation clockwise or counterclockwise, for example by means of an electric motor with which it is drivingly connected.

While the turning bar 14 including its pivot pin consists of round material, the holding bar 15 is formed by a rail having a rectangular cross section, on whose lower end a bearing 21 is mounted due to the fact that the outer ring of the bearing 21 is welded to the holding bar 15. The journal 17 of the turning bar 14 passes through the bearing 21, and the holding bar 15 is in this manner supported pivotingly on the turning bar 14.

From the turning bar 14 runs an outwardly pointing boom 22 affixed to the turning bar, on whose free outer end a link arm 23 is articulated at 24, whose basic alignment points toward the circumference of the tubular film. At 25 at the end of the link arm 23 there is journaled a connecting piece 27 which, like the bar units 11, 12, 13, is common to all segment groups 2, 3 and 4.

The boom 22 and the link arm 23, including the width of the connecting piece 27, have in the represented example approximately the same length across the tubular film withdrawal direction 1, and they are disposed approximately in a central transverse plane of each corresponding bar unit 11, 12, 13. This arrangement assures desirable points of engagement for performing the adjusting movements, with good visibility, and it requires little space.

The geometrical line of action 28 of the supporting segments 5, 6 and 7 between the pivot axis of the turning bar 14 of the corresponding bar unit 11, 12 and 13 and the pivot axis 25 of the connecting piece 27 on the link arm 23 of the bar unit next following in the direction of the arrow 31 forms with the latter, when the bar units 11, 12 and 13 are in a position corresponding to the maximum tubular film diameter that can be supported (cf. FIG. 3), an angle $\alpha$ of less than 180°, which in the case of the embodiment represented, which has three bar units 11, 13 and 13 distributed at equal angular intervals around the circumference of the tubular film, amounts to about 165° to 175°.

Figure 3:
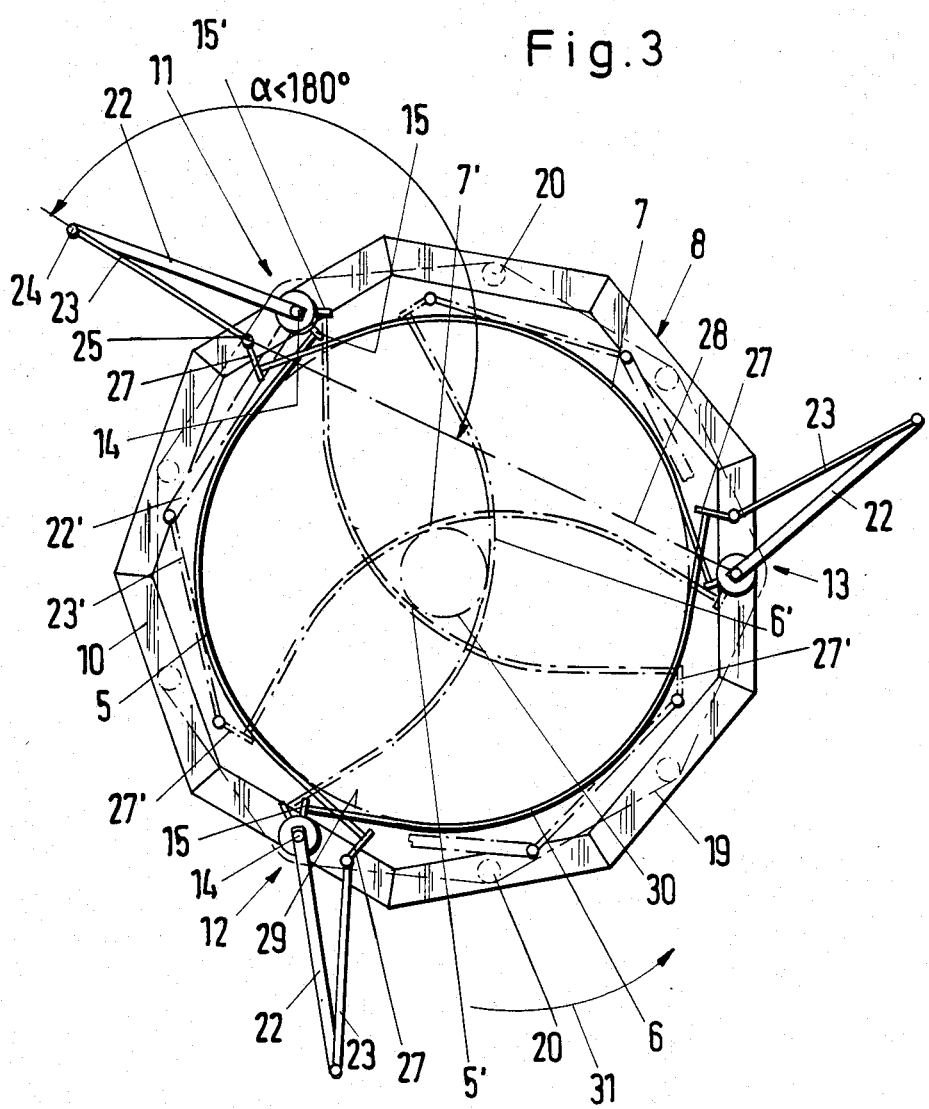
FIG. 3 is a cross section through the supporting apparatus according to the invention, taken along the line III—III of FIG. 1.

The supporting segments 5, 6 and 7 are all of identical configuration and are in the shape of arcs of a circle with straight ends, while their radius of curvature corresponds to the maximum supportable tubular film diameter. In FIG. 3 the circumferential line of the tubular film of maximum supportable diameter is represented in a broken line at 29, while the circumference of a tubular film with the approximately smallest supportable diameter is indicated at 30.

The supporting segments 5, 6 and 7 of each segment group 2, 3 and 4 are held in such a manner that a given supporting segment, e.g., supporting segment 5, is held by one end in the holding bar 15 of the corresponding bar unit—bar unit 11 in the assumed example—while the other end of the supporting segment 5 is held in the connecting piece 27 of the bar unit next following in the direction of arrow 31, i.e., bar unit 12. The supporting segments 5, 6 and 7 can each be held by bolting their straight end portions to the holding bar 15 at one end and to the connecting piece 27 at the other.

In FIG. 3, the bar units 11, 12 and 13 with their groups 2, 3 and 4 of supporting segments 5, 6 and 7 are represented in the position which corresponds to the maximum supportable tubular film circumference 29. As can be seen from the drawings, the tubular film circumference is nearly completely surrounded by the supporting segments 5, 6 and 7, so that the tubular film undergoes a corresponding gauging and stabilization of its circular shape. The supporting segments 5, 6 and 7 lie in a known manner in closely adjacent horizontal planes and transverse planes running perpendicular to the tubular film withdrawal direction 1, so as to form in plan the annular shape represented, by overlapping one another at the ends. By actuating the drive means 19 so as to perform a rotational movement in the direction of the arrow 31, a simultaneous rotation of the turning bars 14 in all bar units 11, 12 and 13 is performed, which results in a corresponding outstretching of the boom 22 and of the link arm 23 in the bar units 11, 12 and 13, with the result that a more or less great inward movement of boom 22, preceded by link arm 23, is performed toward the center of the apparatus, until the supporting segments 5, 6 and 7 apply themselves to the correspondingly smaller tubular film circumference. This is accompanied by a gradually increasing departure of the area enclosed by the supporting segments 5, 6 and 7 from the circular shape toward a basic triangular shape which, in the example represented, is assumed in the supporting of the tubular film of smallest diameter. At the same time, each side of the triangle formed in common by the supporting segments 5, 6 and 7 is applied to the tubular film circumference 30 with more or less large, unsupported areas between them. Even this limited support, however, can be sufficient in many cases, especially in the case of tubular films of small diameters, in which the precise circular shape and precision of the diameter of the tubular film is of no special importance. In any case, the represented apparatus offers to this extent a wide variety of applications, with a broad range of adjustment, which in the represented example using three supporting segments in each group of segments covers a range of about 1:5 to 1:6. For clarification of the adjustment process, the positions 5', 6' and 7' of the supporting segments when supporting the smallest tubular film diameter 30 are represented in broken lines together with the maximum positions represented in solid lines.

I claim:

1. An apparatus for the external support of tubular films of thermoplastic material issuing in a given direction from an extruder, comprising a plurality of groups of a plurality of tubular film supporting segments, said plurality of groups being arranged successively in the direction of issuance of the tubular films from the extruder, the supporting segments in each group being arranged in relation to each other so as to surround a tubular film issuing from said extruder, each supporting segment having a curved portion and a first end and a second end, a supporting frame for supporting said plurality of groups of supporting segments, a plurality of bar units on said supporting frame, each bar unit comprising a turning bar pivotally journalled in the supporting frame and extending in the direction of issuance of tubular film from said extruder, a boom connected to and extending outwardly from said turning bar, a holding bar aligned parallel to and pivotally connected to said turning bar and extending in the direction of issuance of tubular film from said extruder, a connecting piece interconnected with said turning bar and extending in the direction of issuance of tubular film from said extruder, and a link arm interconnecting said boom and said connecting piece, the holding bar of one bar unit being directly connected to the first end of a supporting segment in each group and the second end of the respective supporting segment in each group being connected to the connecting piece of a bar unit adjacent said one bar unit, wherein adjustments of the bar units adjusts the turning bars and holding bars of the bar units to simultaneously and equally adjust the plurality of groups of supporting segments to accommodate different tubular film diameters.

2. An apparatus as in claim 1, wherein the boom of each bar unit has an inner end and an outer end, the inner end of the boom is connected to the turning bar, the link arm is articulated to the outer end of the boom, and the link arm extends from the outer end of the boom inwardly towards the tubular film supported in the apparatus.

3. An apparatus as in claim 1, wherein the boom and link arm of each bar unit are of approximately equal length and extend transversely of the direction of issuance of the tubular film from the extruder.

4. An apparatus as in claim 1, wherein each bar unit has a central plane transverse to the direction of issuance of the tubular film from the extruder, the boom of each bar unit is connected to the turning bar of the respective bar unit and extends outwardly therefrom approximately in said central transverse plane, and the link arm interconnects the boom and connecting piece of the respective bar unit approximately in said central transverse plane.

5. An apparatus as in claim 1, wherein each supporting segment of a group has a geometric line of action, the turning bar of each bar unit has a pivot axis, and the connecting piece on the link arm of each bar unit has a pivot axis, and wherein the geometric line of action of each supporting segment encloses an angle of less than 180° between the pivot axis of the turning bar of the respective bar unit and the pivot axis of the connecting piece on the link arm of an adjacent bar unit when the adjacent bar unit is in a position corresponding to a maximum supportable tubular film diameter.

6. An apparatus as in claim 5, comprising three successive groups of three tubular film supporting segments, and three bar units arranged at equal intervals around a circle surrounding tubular films issuing from the extruder, said circle defining a plane transverse to the issuance of tubular films from the extruder, wherein said angle is approximately 165° to 175°.

7. An apparatus as in claim 1, wherein each supporting segment has the shape of an arc with straight end portions, the arc having a radius equal to a maximum supportable tubular film diameter.

8. An apparatus as in claim 1, further comprising first and second terminal journal means for each bar unit, a drive device connected to the first terminal journal means of each bar unit, and a revolving drive means engaging each drive device for rotating the turning bar of each bar unit simultaneously by equal angular amounts.

9. An apparatus for the external support of a tubular film of thermoplastic material issuing from an extruder, comprising a plurality of curved film supporting segments, said curved supporting segments being arranged in relation to each other so as to surround a tubular film issuing from said extruder, each supporting segment having a first end and a second end, a supporting frame for supporting said plurality of supporting segments, a plurality of bar units on said supporting frame, each bar unit comprising a turning bar pivotally journalled in the supporting frame and a holding bar aligned parallel to and pivotally connected to said turning bar, and a connecting piece interconnected with said turning bar, the holding bar of one bar unit being directly connected to the first end of a supporting segment and the second end of the respective supporting segment being connected to the connecting piece of a bar unit adjacent said one bar unit, each bar unit further comprising a boom connected to and extending outwardly from the turning bar of the bar unit and a link arm interconnecting the boom and the connecting piece of an adjacent bar unit, whereby adjustment of the bar units simultaneously and equally adjust the plurality of supporting segments to accommodate different tubular film diameters.

10. An apparatus as in claim 9, wherein the boom of each bar unit has an inner end and an outer end, the inner end of the boom is connected to the turning bar, the link arm is articulated to the outer end of the boom, and the link arm extends from the outer end of the boom inwardly towards the tubular film supported in the apparatus.

* * * * *